Oct. 28, 1969     S. R. GILFORD     3,475,127
FLUID SAMPLE MEASURING AND DILUTING METHOD AND APPARATUS
Filed July 15, 1965     2 Sheets-Sheet 1
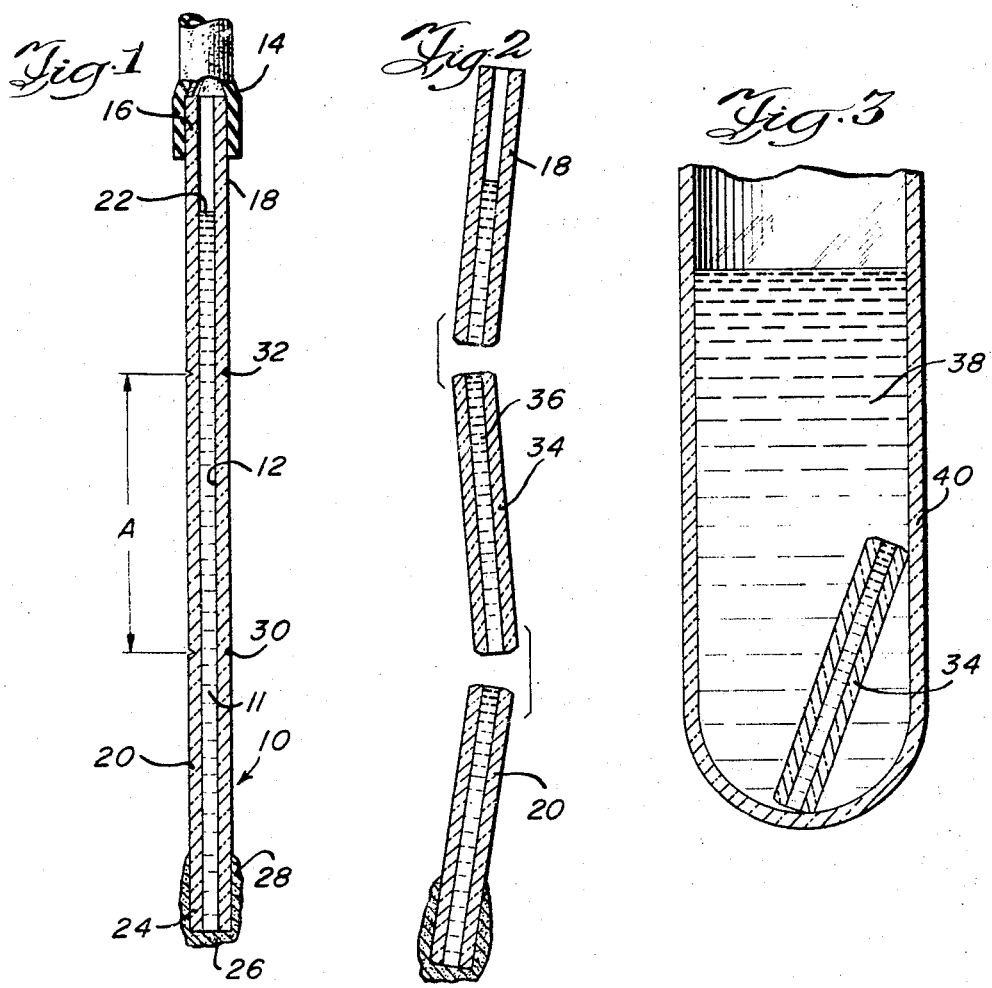
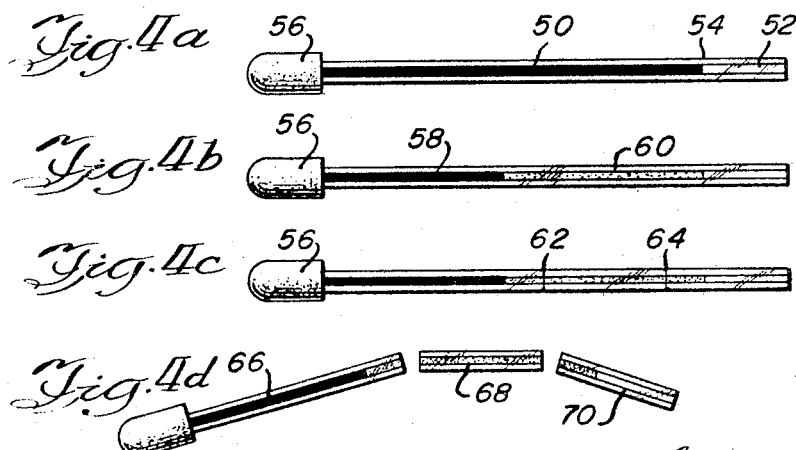
INVENTOR
Saul R. Gilford
By Silverman & Cass
ATTORNEYS Oct. 28, 1969    S. R. GILFORD    3,475,127
FLUID SAMPLE MEASURING AND DILUTING METHOD AND APPARATUS
Filed July 15, 1965    2 Sheets-Sheet 2
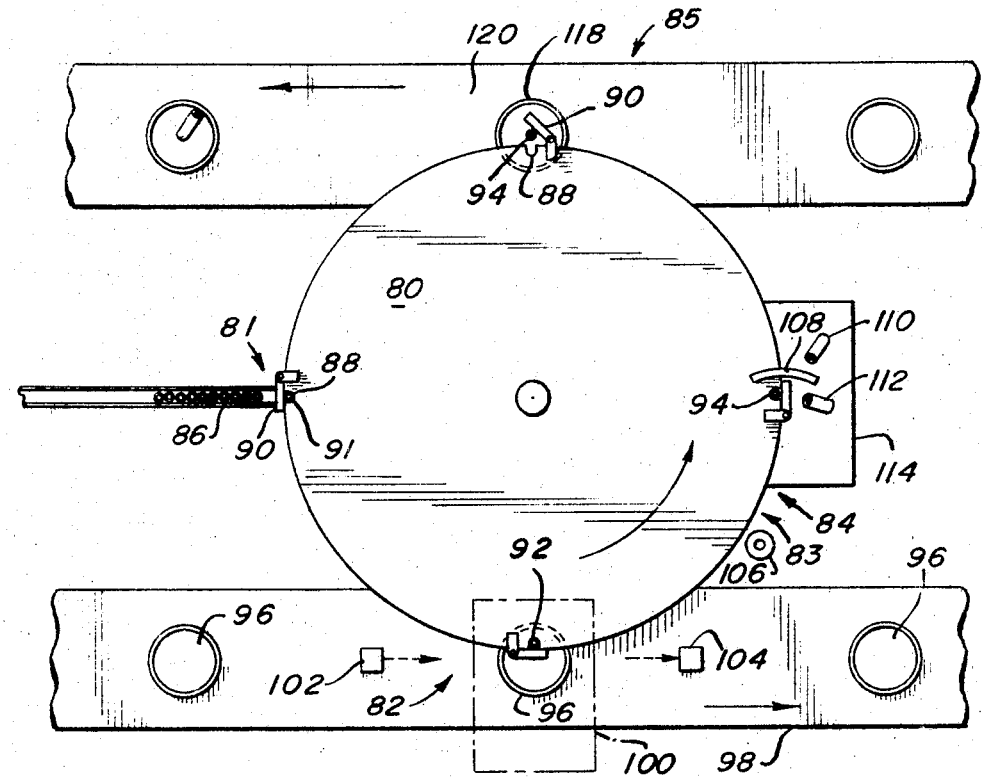
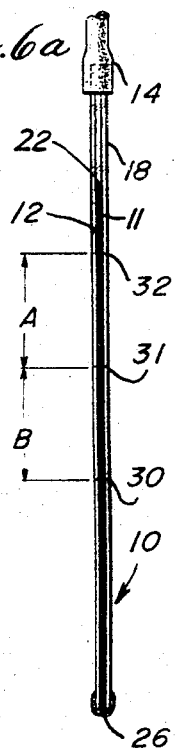
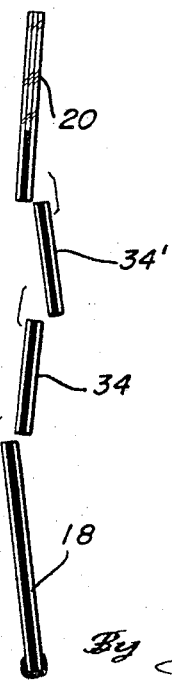
INVENTOR
Saul R. Gilford
By Silverman & Cass
ATTORNEYS United States Patent Office 3,475,127
Patented Oct. 28, 1969

3,475,127
FLUID SAMPLE MEASURING AND DILUTING METHOD AND APPARATUS
Saul R. Gilford, Oberlin, Ohio, assignor to Gilford Instrument Laboratories, Inc., a corporation of Ohio
Filed July 15, 1965, Ser. No. 472,294
Int. Cl. G01n 33/16
U.S. Cl. 23—230                    20 Claims

ABSTRACT OF THE DISCLOSURE

A method for measuring precise volumes of fluid samples for subsequent treatment thereof which involves the use of elongate capillary tubes and comprises the steps of drawing fluid from the sample into the bore of the capillary tube to form a fluid column, scoring the capillary tube at a predetermined location between the ends of the fluid column and subsequently severing the tube at the score line to form at least a remanent section having a predetermined known volume of fluid entrapped therein. The method may be practiced upon blood samples and the tubes may be prescored or scored subsequent to entrainment of the fluid therein. A rotatable indexing table effects an automatic serial manipulation of the capillary tube lengths in performing the method, said indexing table having means disposed thereon successively to perform the filling, scoring and severing steps. Dilution of the remanent segments of the capillary tube is one of the treatments possible.

---

This invention relates generally to a novel method for measuring fluid samples such as blood and the like and making dilutions thereof for laboratory tests and to apparatus for practicing the method. In a more particular consideration, the invention is concerned with a method of measuring a precise quantity of blood or the like in a section of tubing and performing certain operations upon the tubing to separate the quantity from the remainder of the tubing for subsequent treatment thereof, as for example, dilution thereof and to apparatus of a manually or automatically usable kind to practice the method.

The primary consideration in performing medical and biological tests is accuracy. When accuracy can be obtained only by tedious, difficult and expensive techniques, the value of the tests decreases because such tests are not used extensively. Certain tests are required in practically all hematology laboratories, and where such tests are not accurate and reproducible, the value is decreased; where too much time is required, skilled personnel are tied up; where tests are unduly expensive for any reason, there is a hardship on those required to pay for them.

The invention herein provides a method to perform hematologic and blood chemistry tests, as well as other tests where accurate determinations of very small quantities of fluid samples must be made, which is fast, accurate, reproducible and extremely economical. These goals are so achieved by the present teachings such that the structure containing the precise volume of sample may be disposed after being used only once without appreciably increasing the cost of the analysis.

Another important object of the invention is to provide a method of measuring biological fluids which requires very minute quantities of fluid, and another phase of this object is to provide such a method wherein a plurality of tests and hence a plurality of minute quantities is required.

Other objects of the invention are concerned with the provision of effective and economical apparatus for carrying out the method of the invention either manually or automatically.

Many other objects will occur to those skilled in this art as a description of the invention proceeds in connection with which preferred embodiments have been described and illustrated in the accompanying drawings in which:

FIGS. 1, 2 and 3 are fragmentary sectional somewhat diagrammatic views of a capillary tube being used in accordance with the invention to obtain a precise dilution of a small quantity of liquid, the scale thereof being somewhat exaggerated.

FIGS. 4a, 4b, 4c and 4d comprise elevational and somewhat diagrammatic views of a capillary tube being used in a hematocrit count and related determinations, the respective views showing the progressive condition of the apparatus in different phases of the practice of the method.

FIG. 5 is a top plan diagrammatic view of apparatus operated for making dilutions using the inventive concept.

FIGS. 6a and 6b are views similar to those of FIGS. 1 and 2, respectively, but on a much smaller scale and utilizing a somewhat longer section of capillary tubing, suitably scored for division into a plurality of sections to provide a plurality of samples of known volume of fluid.

Basically the invention overcomes the well-known objections and difficulties inherent in the use of capillary tubing for measurements as known and practiced thus far. A quantity of a fluid sample is entrained in a capillary tube having a bore of accurately known cross section to produce a column of such fluid sample, the tube is scored to measure a precise section of the column between score lines, the tube is broken at the score lines to entrap that precise quantity of sample only in the remanent section, the remainder of the tube is discarded, and the broken off remanent section is wholly dropped into the diluent and agitated to produce the desired dilution. Where a plurality of tests are to be made using the identical fluid sample, there may be several score lines and several remanent sections, each entrapping a precise predetermined quantity of the fluid sample.

The invention depends upon recognizing that the capillary column and container will break precisely at the same point and recognizing that the remanent section or sections may be physically immersed into a quantity or respective quantities of liquid with which the fluid sample in the column is to be mixed and will provide the dilution by simple agitation.

The invention contemplates the use of pre-scored tubing or tubing which may be scored.

In FIG. 1 there is illustrated a length of capillary tubing 10 having a very fine bore, such as the type used in taking small blood samples or in blood sampling pipets. The usual pipet used has accurate markings on its exterior, must be filled carefully to avoid overfilling with resultant contamination of the interior of the bore, and must be carefully cleaned on its exterior so as to deliver an accurate volumetric quantity into the body of diluent. Permitting the usual capillary tube or pipet to fill by capillary action alone is too slow with a result that pressure must be used and this requires careful surveillance of the rising column.

In FIG. 1 the tube 10 has been dipped into a sample, such as blood, and a column of this fluid 11 has been drawn into the bore 12 by applying suction to a rubber tube 14 or the like engaged over the end 16 of the end section 18. The forward end section 20 is that part which has been dipped into the fluid and the fluid has entered the bore to the level 22. The entrance end 24 has a bulge of the fluid attached as shown at 26 especially if the fluid is thick and sticky as blood. Likewise the outer wall surface of the section 20 may have a film or adhering layer as at 28.

According to the invention, the tube 10 is provided with scored notches or grooves at 30 and 32, these being pre-scored or being applied just before or after filling the tube 10. Abrasive wheels, fine abrasive-carrying airstreams, carbide or hardened steel tools may be used. The scores may be partial or completely circumferential. Between the two scored notches or grooves there is defined a precise volume of fluid 11, this volume being related to the dimension A as shown in FIG. 1. Since uniform and accurate bore dimensions are capable of being obtained in readily available capillary tubing, the dimension A may be chosen to represent any desired volume.

For example, in determining the hemiglobin content of blood, a test which is routine in every hematological laboratory, a 20 microliter sample of blood is diluted in 5 or 6 milliliters of a suitable reagent and subjected to colorimetric testing. The quantity included between the score lines 30 and 32 may accurately be determined to be 20 microliters in any given capillary tubing to enable the choice of dimension A.

In accordance with the invention, no precautions need be taken in filling the tube 10 other than to be certain that the level 22 is somewhat beyond the score line 32 and that the tube has not been dipped into the sample so far as to have the film 28 reach the score line 30. The technician than breaks the tube 10 into three sections at the score lines, as shown in FIG. 2, and discards the end sections 20 and 18, retaining the central remanent section 34 with its accurately entrapped volume of fluid. This volume is designated 36.

In the next step, this remanent section 34 with its volume of fluid 36 is dropped into the reagent 38 that is carried in a vessel 40 and is agitated. The fluid 36 will readily mix with the reagent to give the desired dilution, and further processing may be accomplished either with or without the small section 34 in the vessel 40, or the solution may be transferred to other vessels or cuvettes.

Conveniently, a quantity of pre-scored capillary tubes 10 of any desired included volumes between score lines may be maintained in a laboratory ready for use. The tubing may be glass or other readily frangible material, but glass is the most common and least likely to fracture unevenly.

In FIGS. 4a to 4d there are illustrated the steps in a hematocrit count using the invention, in combination with another procedure which requires the use of the blood plasma alone. First the blood sample 50 is drawn into a capillary tube 52 to a predetermined level 54. Although a hematocrit count is a determination of percentage of packed red blood cell volume compared to the total, and this can be measured irrespective of the height of the column, for convenience it is best to have a known level 54 to compare with other samples and with calibrated gauges.

After the sample 50 has been taken, the entrance end, at the left in FIG. 4a, is capped or sealed as shown at 56. The tube 52 may be permitted to stand, to effect settlement, or may be centrifuged. This packs the red cells into the bottom as shown at 58 leaving the clear plasma in a stratum above the packed cells as shown at 60. The desired measurement of hematocrit is now made. It is now possible to make the next test using the serum alone.

As shown in FIG. 4c, the tube is scored at 62 and 64 to define a precise volume of plasma alone. Then the tube is broken at the score lines 62 and 64 into three sections shown in FIG. 4d at 66, 68 and 70. The end sections 66 and 70 are discarded, and the remanent center section 68 having the accurately entrapped volume of plasma may now be processed quantitatively. This procedure eliminates the need for decanting the plasma, and obviates the danger of stirring up the packed cells contaminating the plasma.

The general method described may be done automatically, as shown in FIG. 5. Here there is a rotatable indexing table 80 which rotates between a plurality of stations. These stations are five in number, and may be designated generally 81, 82, 83, 84 and 85. At the loading station 81, lengths of capillary tubing are fed from a holder or storage device 86 into a socket or notch 88 and an automatic clamping device 90 clamps the length of tubing to the table 80. This is called holding means in the claims. The length of tubing is shown at 91.

At station 82, the length of tubing designated 92 is brought into position over a sample vessel 96 on a conveyor 98 moving to the right in FIG. 5. A pressure filling device, shown as a broken line block 100 will operate to fill the length of tubing 92 from the sample vessel 96. For example, the conveyor may be raised to carry the vessel up to the bottom end of the length of tubing, and a fitting may be lowered onto the top end of the length of tubing and apply the necessary suction. Suitable photoelectric devices may sense the height of the column in the tubing to stop the suction and lower the conveyor. The photosensitive devices may include a light source 102 and a scanner 104, or any other suitable apparatus.

At station 83, the tubing passes a scoring device 106 which may have a pair of rotating abrasive wheels that provide the necessary score lines upon the clamped length of tubing.

At station 84, the table 80 carries the length of tubing past a pair of fixed arms 108 which are located proximate to the top and bottom of the table, and these engage the ends of the tubing section and break these off. These are shown at 110 and 112 falling into a discard hopper 114. The remanent section of the tubing is designated 94 and it is carried around to the station 85.

At the station 85, the clamping means 90 is released, as shown, by some structure as, for example, a solenoid, and the remanent section 94, being free, drops out of its notch 88 into a vessel 118 of some diluent. The vessel 118 is carried on a conveyor 120 moving to the left and the contents of the vessel may be agitated, carried into the beam of a spectrophotometer, or brought to other processing apparatus.

It will be appreciated that while the illustration is highly simplified and diagrammatic, the structure to accomplish the functions described as well as the structure mentioned generally may readily be purchased and assembled or built with the teachings hereof.

It will be appreciated that a direct and important feature of the invention is that its practice is exremely economical of the test fluids. This becomes critical where only minute quantities are available, as for example in pediatrics or in research with small animals. Where a plurality of tests are to be made, the method and apparatus of the invention provide advantages not known by the use of other methods and apparatus which cannot approach the simplicity and economy provided.

In FIG. 6, a length of capillary tubing 10, having a bore 12, is dipped into a test fluid and the fluid 11 is drawn into the bore up to the point 22 by suction applied to tube 14 engaging the upper end 18. Instead of only two scored grooves, as in FIG. 1, for example, three scored grooves 30, 31 and 32 are provided at precise locations, spaced apart as at A and B. The point 22 is above the score line 32. The worker may break the length of tubing 10 into end sections 18 and 20 which are discarded, and as shown in FIG. 6b will have remanent sections 34 and 34' for use in making two tests. By having more score lines, more than two remanent sections can be provided, with extreme economy. The tubing 10 may have pre-scored lines to provide for a plurality of measuring sections, leaving to the user the choice of breaking off one, two or more measuring sections at will.

Variations are readily capable of being made without departing from the scope of the invention as defined in the appended claims. For example, the station 83 and scoring means 106 may be omitted by using pre-scored lengths of capillary tubing in FIG. 5.

What it is desired to secure by Letters Patent of the United States is:

1. A method of measuring a precise quantity of a fluid in a capillary tube of known cross-sectional area, comprising the steps of:
   (a) drawing the fluid into the bore of the tube to form a fluid column therein,
   (b) scoring the tube between the ends of the fluid column, and
   (c) severing the tube at the score line subsequent to drawing the fluid thereinto to form at least two segments, one of said segments entrapping a predetermined volume of fluid therein.

2. A method of measuring for subsequent treatment thereof a precise quantity of fluid in a capillary tube of known cross-sectional area, comprising the steps of:
   (a) drawing the fluid into the bore of the tube to form a continuous fluid column therein,
   (b) transversely scoring the tube at a plurality of locations between the ends of the fluid column and spaced a predetermined distance apart to define at least one remanent section of known volume, and
   (c) severing the tube at the score lines subsequent to drawing the fluid thereinto to release said remanent section, said remanent section having said known volume of fluid entrapped therein.

3. The method as described in claim 2, wherein said severed remanent section is subsequently treated by placement into a diluent containing vessel and the vessel then being agitated to mix its contents to desired dilution.

4. The method as claimed in claim 2 in which there are at least three score lines and the tube is severed at such lines to provide at least two remanent sections of known volumes, respectively.

5. A method of measuring a precise quantity of a fluid in a capillary tube of known cross-sectional area having a plurality of spaced pre-scored locations, comprising the steps of:
   (a) first drawing the fluid into the bore of the tube forming a fluid column encompassing the pre-scored locations, and
   (b) severing the tube subsequent to drawing the fluid therein and at the pre-scored locations to release at least one remanent segment having a known volume of fluid entrapped therein.

6. A method of measuring and thereafter mixing with a second fluid, a precise quantity of fluid in a capillary tube of known cross-sectional area having a plurality of spaced pre-scored locations along the length thereof, comprising the steps of:
   (a) drawing the fluid into the bore of the tube to form a fluid column therein extending beyond the pre-scored locations,
   (b) thereafter severing the tube at the pre-scored locations to release a remanent section of tube having a known volume of fluid entrapped therein,
   (c) placing only said remanent section in a vessel containing the second fluid,
   (d) and then agitating the remanent section and second fluid in said vessel to intermix same.

7. A method of measuring a precise quantity of blood plasma in a capillary tube of known cross-sectional area, comprising the steps of:
   (a) drawing a blood sample into the bore of the tube to a predetermined level through the entrance end of said tube,
   (b) capping the entrance end of said tube,
   (c) segregating completely said heavier red blood cells of said sample to a position near the entrance end of said tube from the lighter plasma of said sample at a portion of said tube remote from said entrance end,
   (d) scoring said portion of said tube containing said plasma at two spaced positions defining therebetween a tube section of predetermined length containing only plasma.
   (e) severing said tube at the scoring and freeing said section having a predetermined volume of plasma entrapped therein.

8. The method as defined in claim 7 wherein said segregating of blood cells and plasma is accomplished by centrifuging.

9. The method of providing a plurality of samples of the same fluid for a plurality of tests which comprises first drawing a quantity of fluid into an elongate capillary tube having a bore of known cross section forming a continuous fluid column therewithin, breaking off sections of predetermined length of the tubing within the bounds of the column whereby to entrap known volumes of fluid respectively in said sections, and removing the quantities of fluid from the respective sections as said samples for the respective tests.

10. An automated method of meauring a precise quantity of fluid material in capillary tubes of known cross-sectional areas, said method comprising the steps of:
    (a) securing a length of tubing by clamping means to an indexing table, while said table is in a first position,
    (b) indexing said table to a second position,
    (c) filling said length of tubing to form a continuous fluid column therein at said second position,
    (d) indexing said table to a third position,
    (e) scoring said clamped length of tubing between the ends of the fluid column therein,
    (f) indexing said table to a fourth position,
    (g) severing said scored tubing at the scores into a plurality of sections, one of said sections being retained in position at all times by said clamping means,
    (h) indexing said table to a fifth position,
    (i) and releasing said clamping means so that said retained severed section with a known volume of fluid entrapped therein may be processed further.

11. A pipet for measuring and providing a precise volume of a fluid for use in processing of said fluid comprising a frangible, open ended tube having a capillary bore of known cross section and adapted to have the fluid forced thereinto, said tube having transverse score lines on the exterior thereof spaced apart a predetermined distance whereby the said precise volume of the fluid is contained in the bore between said score lines, the score lines being of such character and depth as to permit ready severing of the tube thereat by application of lateral strain whereby to produce at least one length of tube with said volume entrapped therein.

12. A structure as claimed in claim 11 which includes means for capping one end of said tube whereby to enable centrifuging of said tube about the second end thereof.

13. A stucture as claimed in claim 12 in which the fluid is blood and the score lines are located relative to said one end at a position to contain only plasma between them when the cells of the blood have been packed down adjacent said one end.

14. Apparatus for measurement and dilution of predetermined quantities of a fluid which comprises an indexing table having holding means for carrying individual lengths of capillary tubing at spaced locations on said indexing table, the table being movable in a predetermined cyclic program to bring said locations consecutively adjacent to a plurality of successive stations, a first station having means for feeding one length of said tubing to one of said holding means, a second station including a container with a supply of fluid, the apparatus including means for mving the tubing length and container relative to one another to place an end of the length in the fluid, means for entraining a quantity of fluid into the bore of the length of tubing a fluid column extending at least a predetermined distance, a third station having means for severing the length of tubing between the ends of the fluid column on opposite ends of a remanent section of a predetermined length and removing the tubing ends to leave said one remanent section in said one holding means, said remanent section having entrapped within its entire length a predetermined quantity of said fluid, and a fourth station having means for releasing said remanent section from said holding means for placement thereof in a body of diluent, the indexing table being arranged to return said one holding means to said first station from said fourth station for reception of another length of capillary tubing after said first mentioned remanent section has been released.

15. The apparatus as claimed in claim 14 in which the lengths of tubing are pre-scored at axial locations spaced apart to define said predetermiend length, and the severing means act to sever said tubing ends at the scored locations.

16. The apparatus as claimed in claim 14 in which there is an additional station between the second and third stations and means are provided at said additional station for scoring the length of tubing at spaced apart locations between the ends of said fluid column to define said predetermined length, and in which the severing means act to sever the tubing ends at said scored location.

17. The apparatus as claimed in claim 14 in which there is a conveyor adjacent said table at said fourth station and receptacles are provided on said conveyor to move consecutively relative to said fourth station to receive therein said remanent section when released from said table.

18. A method for measuring a predetermined quantity of a fluid using a capillary tube of known cross-sectional area, said method comprising the steps of:
    (a) first entraining the fluid in the bore of the tube to form a continuous fluid column therein, and
    (b) thereafter severing the tube into at least two segments between the ends of the fluid column, one of the segments being a remanent segment of predetermined length and entrapping a predetermined precise quantity of the fluid.

19. The method of measuring as defined in claim 18 comprising the further step of: scoring the tube in at least one predetermined location prior to severing it, said severing being at said scoring.

20. A method for measuring a predetermined quantity of a fluid using a capillary tube of known cross-sectional area, said tube being pre-scored at a plurality of spaced locations, said method comprising the steps of:
    (a) securing a length of the tubing to a multi-position indexing table while the table is in a first position,
    (b) indexing the table to a second position,
    (c) drawing the fluid into the bore of the tubing along the length thereof to define a fluid column and extending at least over a pair of consecutive scores,
    (d) indexing the table to a third position,
    (e) thereafter severing the tubing at the scores into a plurality of sections, one of the sections being secured at all times to the indexing table,
    (f) indexing the table to a fourth position, and
    (g) releasing the secured severed section so that it with a known volume of liquid entrapped therein may be processed further.

References Cited

UNITED STATES PATENTS 3,177,723   4/1965   Pederson.

OTHER REFERENCES

Weissburger, A.: Technique of Organic Chemistry, vol. 1, part 1, pp. 174–175, cover page (1959).

MORRIS O. WOLK, Primary Examiner

E. A. KATZ, Assistant Examiner

U.S. Cl. X.R.

23—253, 259, 292; 73—425.4; 222—424.5

PO-1050
(5/69)

UNITED STATES PATENT OFFICE
CERTIFICATE OF CORRECTION

Patent No. 3,475,127                    Dated Oct. 28, 1969

Inventor(s) SAUL R. GILFORD

It is certified that error appears in the above-identified patent and that said Letters Patent are hereby corrected as shown below:

Column 2, line 31 for "sample" read --fluid sample--. Column 3, line 13 for "hemiglobin" read --hemoglobin--. Column 6, line 67 for "mving" read --moving--. Column 7, line 12 for "predetermiend" read --predetermined--; line 13 for "tubing en read --tubing--; line 21 for "tubing ends" read --tubing--; a same line for "location" read --locations--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents